United States Patent
Yamashita et al.

[11] Patent Number: 5,181,151
[45] Date of Patent: Jan. 19, 1993

[54] THIN-FILM PERPENDICULAR MAGNETIC RECORDING AND REPRODUCING HEAD HAVING THIN MAGNETIC SHIELD FILM ON SIDE SURFACES

[75] Inventors: Masami Yamashita, Kawasaki; Noboru Iwato, Zama; Hideki Mine, Amagasaki; Wada Toshiaki, Takatsuki, all of Japan

[73] Assignees: Sumitomo Special Metals Co., Ltd., Osaka; Denki Kagaku Dogyo Kabushiki Kaisha, Tokyo, both of Japan

[21] Appl. No.: 685,652

[22] Filed: Apr. 16, 1991

[30] Foreign Application Priority Data

Apr. 19, 1990 [JP] Japan ................................ 2-103922

[51] Int. Cl.[5] .............................................. G11B 5/147
[52] U.S. Cl. .................................................... 360/126
[58] Field of Search ......................................... 360/126

[56] References Cited

U.S. PATENT DOCUMENTS 4,771,350 9/1988 Desserre ...................... 360/126 X Primary Examiner—A.J. Heinz
Attorney, Agent, or Firm—Watson, Cole, Grindle & Watson

[57] ABSTRACT

A thin-film perpendicular magnetic recording and reproducing head including a magnetic member defining a return path and having a narrow groove formed in one of its principal surfaces in parallel to a sliding surface adapted to face a magnetic recording medium, a non-magnetic material filling the groove, and a multi-layer film assembly formed above the groove and consisting at least of a thin-film conductor coil, an interlayer insulating film, a thick main pole film, a main pole film and a protective film formed one upon another. The magnetic member is connected to the main pole film through a via hole portion, and is exposed on the sliding surface in the vicinity of the main pole film so as to face the recording medium. A thin magnetic film serving as a magnetic shield covers the protective film and the sidewall surface of the head and is joined to the sidewall surface of the magnetic member.

19 Claims, 4 Drawing Sheets

THIN-FILM PERPENDICULAR MAGNETIC RECORDING AND REPRODUCING HEAD HAVING THIN MAGNETIC SHIELD FILM ON SIDE SURFACES

BACKGROUND OF THE INVENTION

1. Field of the Invention

This invention relates to thin-film heads which are used for the perpendicular magnetic recording and reproduction of data or information in a computer, tape or videotape recorder, or like apparatus.

2. Description of the Prior Art

The magnetic recording and reproduction of data or information from a recording medium, such as a floppy or rigid disk, has usually been carried out by magnetizing its magnetic layer in the direction of its surface and utilizing the residual magnetization thereof. This way of magnetic recording has, however, a drawback. As a higher recording density is attained by recording signals having a shorter wavelength, an increase of diamagnetism in the recording medium causes a reduction of residual magnetic flux density and thereby results in the failure of the medium to exhibit a satisfactory output for reproduction.

A great deal of research and development work has, therefore, been accomplished to obtain a practically useful magnetic head of the perpendicular recording type which can magnetize the magnetic layer of a recording medium in the direction of its thickness to reduce diamagnetism when recording signals having a short wavelength to achieve an improved recording density. While a variety of constructions have been proposed for this type of magnetic head, a single-pole head of the one-sided access type is the most suitable type from a standpoint of practical use.

The recent requirements for a higher recording density and a shorter access time have, however, created a demand for a smaller and lighter magnetic head. Attention has, therefore, come to be drawn to a thin-film head of the perpendicular magnetic recording type.

A known thin-film perpendicular magnetic recording and reproducing head is constructed as shown by way of example in FIGS. 5a and 5b of the accompanying drawings. FIG. 5a is a front elevation of the transducer portion of the head which faces a recording medium 30, and FIG. 5b is a vertical section thereof. The head comprises a magnetic member 1 formed from, e.g. soft ferrite, a non-magnetic material 3 laid on it and defining a gap layer, a thin-film conductor coil 4 on the non-magnetic material 3, an insulating layer 5 covering the coil 4, a thick-film magnetic layer 7 formed on the insulating layer 5 from, e.g. a Permalloy, Sendust, or amorphous cobalt alloy, a main pole film 8 formed on the layer 7 which prevents the magnetic saturation of the film 8 during recording, and a protective film 9 formed on the film 8 for protecting the head.

The main pole film having a very small thickness has its end portion exposed in the end surface of the head, facing the recording medium, as shown in FIGS. 5a and 5b, and a magnetic flux is, therefore, concentrated on the exposed end of the main pole film, so that the recording of signals is effected by a strong magnetic interaction which occurs between the exposed end of the main pole film and the magnetic layer of the recording medium facing it. The perpendicular magnetic recording type of head can, therefore, achieve a higher recording density than what can be achieved by the older type of head which magnetizes the magnetic layer of the recording medium longitudinally along its surface. The thin-film head has, however, been found to present a serious problem which is due to the very small thickness of its main pole film. It is so easily affected by an external magnetic field which is slightly produced by, e.g., a spindle, or head driving motor, that its output for reproduction is greatly lowered, or even disappears.

Attempts have, therefore, been made to shield the source of any such external magnetic field. Those attempts have, however, been found not only to add to the complexity of apparatus design, but also to be unable to eliminate the influence of any such magnetic field completely. As a consequence, it has been very difficult to obtain a reliable recording and reproducing head.

A solution to this problem has been proposed by, for example, the Japanese patent application laid open to the public under No. 129909/1987 or 129926/1987. It is a magnetic head of the type in which a head chip comprising a main magnetic pole and an auxiliary magnetic pole, as hereinabove described, is mounted within a concavity formed in a magnetic material block serving as a magnetic shield. This type of head has, however, been found difficult to make sufficiently small and light in weight to be a thin-film head. Moreover, its special construction has been found to imposed a great restriction on the shape in which it can be made.

SUMMARY OF THE INVENTION

Under these circumstances, it is an object of this invention to provide an improved thin-film magnetic head which can be satisfactorily shielded from the magnetic field produced by any external source, such as a disk driving motor, while remaining satisfactorily small and light in weight, and which enables the magnetic flux produced by a main magnetic pole not only to reach a surface facing the main magnetic pole, but also to return to the neighborhood of the main magnetic pole.

Extensive research and experimental work has been done to obtain a magnetic shield which is easy to form on a thin-film magnetic head, and can protect the head from the influence of the magnetic field produced by any external source, such as the disk driving motor, while also enabling the effective use of the magnetic flux produced by the main magnetic pole. As a result, it has been found that a magnetic layer formed by, e.g., sputtering, evaporation, or plating on the protective film and the sidewall surface of the head, and serving as a magnetic shield can protect the head from the influence of any externally produced magnetic field, and also enables the magnetic flux produced by the main magnetic pole not only to reach a surface facing it, but also to return to its neighborhood, thereby enabling the head to achieve an improved output for reproduction.

The object of this invention is, therefore, attained by a thin-film perpendicular magnetic recording and reproducing head comprising a magnetic member defining a return path and having a narrow groove formed in one of its principal surfaces in parallel to a sliding surface adapted to face a magnetic recording medium, a non-magnetic material filling the groove, and a multilayer film assembly formed above the groove and consisting at least of a thin-film conductor coil, an interlayer insulating film, a main pole film and a protective film formed one upon another, the magnetic member being connected to the main pole film through a via hole portion, the magnetic member being exposed on the sliding surface in the vicinity of the main pole film so as to face the magnetic recording medium, the head further including a thin magnetic film covering the protective film and the sidewall surface of the head, joined to the sidewall surface of the magnetic member, and serving as a magnetic shield.

The magnetic film serving as a magnetic shield is a soft magnetic film formed from, e.g., a cobalt alloy, Permalloy, Sendust, or ferrite by a vapor-phase film-forming process such as sputtering, or plating. The film preferably has a thickness of 200 Å to 100 microns. If its thickness is smaller than 200 Å, it may fail to be an effective shield, and no substantial improvement can be expected from any film having a thickness exceeding 100 microns. A more preferable range of its thickness is from 1000 Å to 30 microns.

The film serving as a magnetic shield is formed on the protective film and the sidewall surface of the head, preferably except for the terminal portions of the head from which the film is excluded for insulation purposes. Although the film may extend to the sliding surface of the head, it is preferably slightly spaced apart from the sliding surface, so that no edge noise, or other problem may occur.

The film defines a still improved magnetic shield if it is formed as at least one laminate composed of alternate magnetic layers and non-magnetic layers formed from, .e.g., $Al_2O_3$ or $SiO_2$. An intermediate layer can be formed from, e.g., chromium between the protective film and the film defining the magnetic shield to improve the adhesion therebetween.

The magnetic material which is used to form the film serving as the magnetic shield is selected from those which have hereinabove been mentioned by way of example. The selection of the material is based on the magnetic shielding effect as required of the film, and therefore, the magnetic properties thereof. Insofar as most of the materials are not very hard, it may be advisable to form a protective film from an inorganic material, such as $Al_2O_3$ or $ZrO_2$, on the surface of the film defining the magnetic shield to protect it against any surface defect and prevent its separation.

These and other features and advantages of this invention will become more apparent from the following description and the accompanying drawings.

BRIEF DESCRIPTION OF THE DRAWINGS

FIG. 2b is a vertical sectional view of the head shown in FIG. 2a;

FIG. 5b is a vertical sectional view of the head shown in FIG. 5a; and

DETAILED DESCRIPTION OF THE INVENTION

Figure 1:
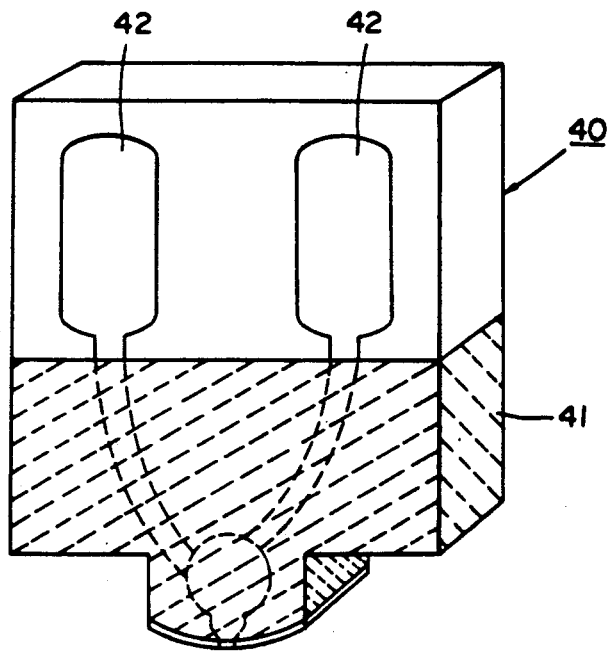
FIG. 1 is a perspective view of a thin-film magnetic head embodying this invention.
Figure 2A:
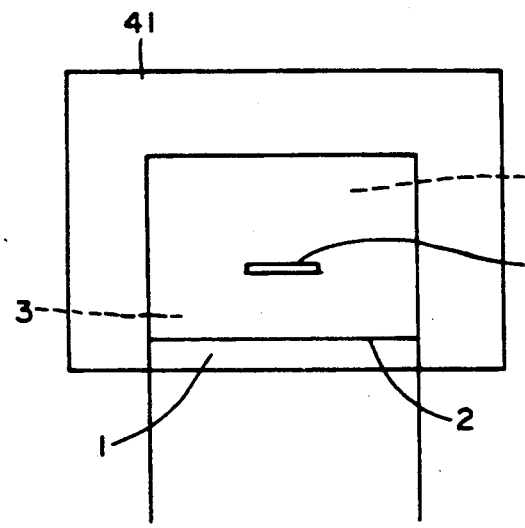
FIG. 2a is a front elevational view of the head embodying this invention.
Figure 2B:
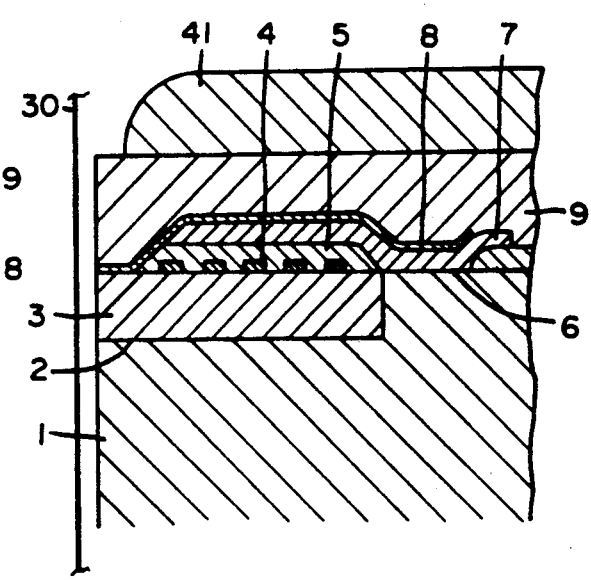
Figure 3:
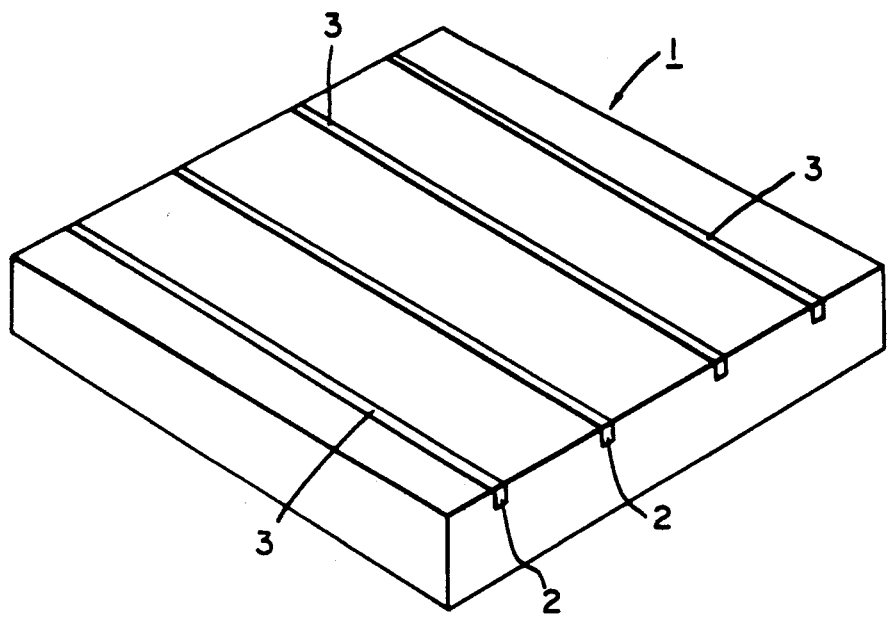
FIG. 3 is a perspective view of a magnetic substrate used for making thin-film magnetic heads according to this invention.

A thin-film magnetic head embodying this invention is shown in FIGS. 1, 2a and 2b. A process for making the head will now be described with reference to FIGS. 3 and 4a to 4f. The construction of the head is believed to become apparent from the following description:

(1) A plurality of parallel and equally spaced apart narrow grooves 2 are formed in one principal surface of a substrate 1 made of a magnetic material, such as Ni-Zn or Mn-Zn ferrite, and are each filled with a molten or sputtered non-magnetic material 3 selected from inorganic materials, such as glass, $SiO_2$, $Al_2O_3$ and barium titanate, whereby a grooved magnetic substrate 1 is obtained. Then, the grooved surface of the substrate 1 is mechanochemically polished. See FIG. 3.

Figure 4A:
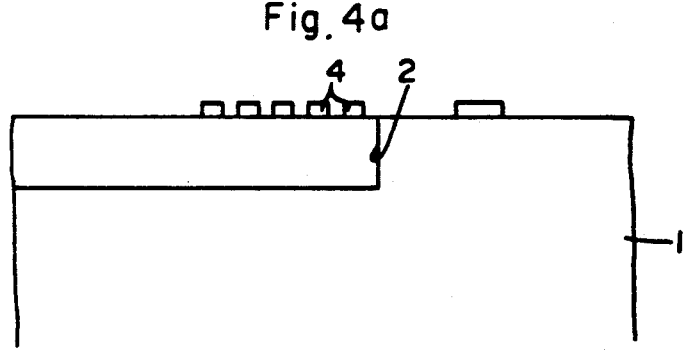
FIGS. 4a to 4f are a series of views illustrating a process for making the thin-film magnetic head according to this invention.

(2) A thin-film conductor coil 4 is formed from, e.g., gold, copper, chromium or aluminum by sputtering or vacuum deposition on the polished surface of the grooved magnetic substrate 1 (FIG. 4a). An insulating layer is formed on the substrate 1 prior to the formation of the coil 4 if the substrate 1 is of Mn-Zn ferrite.

Figure 4B:
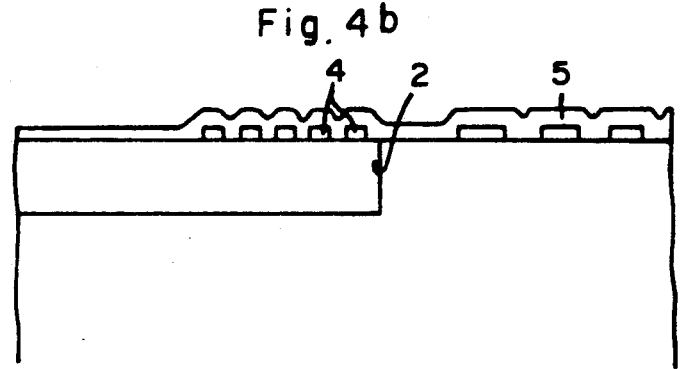

(3) An interlayer insulating film 5 is formed over the coil 4 from an inorganic oxide, such as $SiO_2$ or $Al_2O_3$, or an organic material, such as polyimide, to establish electrical insulation between the coil 4 and a thick main pole film 7 which will later be formed (FIG. 4b).

(4) As the insulating film 5 has an uneven surface formed by the underlying coil 4, it is smoothed to a roughness not exceeding 500 Å by precision polishing, as with a diamond tool, or by etchback.

Figure 4C:
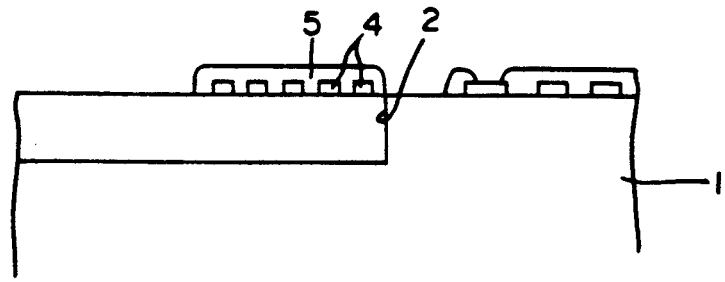

(5) A via hole portion 6, through which the main pole film 7 to be formed will be connected to the magnetic substrate 1, is formed in the interlayer insulating film 5 by, e.g., ionic or chemical etching (FIG. 4c).

Figure 4D:
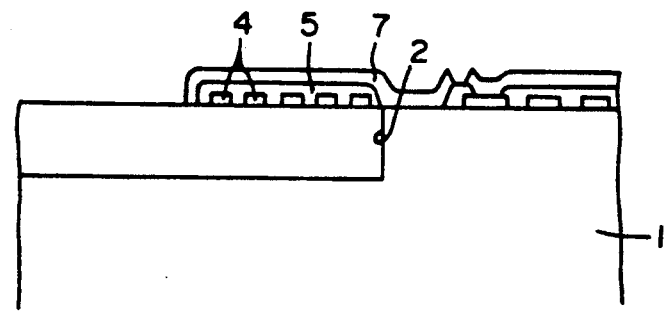

(6) The thick main pole film 7 is formed from, e.g., an iron alloy such as a Permalloy or Sendust, or an amorphous by, e.g., sputtering, vapor deposition, or plating in a specific pattern on the surface of the interlayer insulating film 5 and the surface of the magnetic substrate 1 which has been exposed through the via hole portion 6 (FIG. 4d).

Figure 4E:
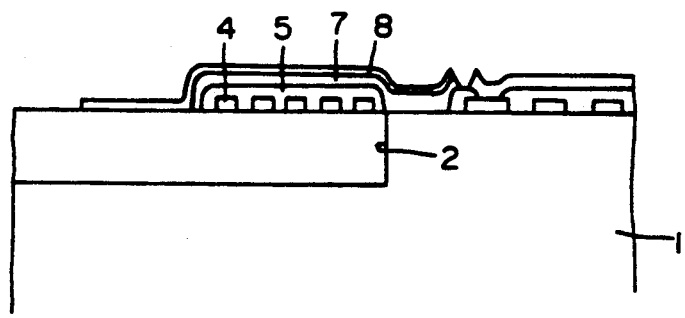

(7) A main pole film 8 is formed by, e.g., sputtering, vapor deposition, or plating in a specific pattern on the thick main pole film 7 (FIG. 4e).

Figure 4F:
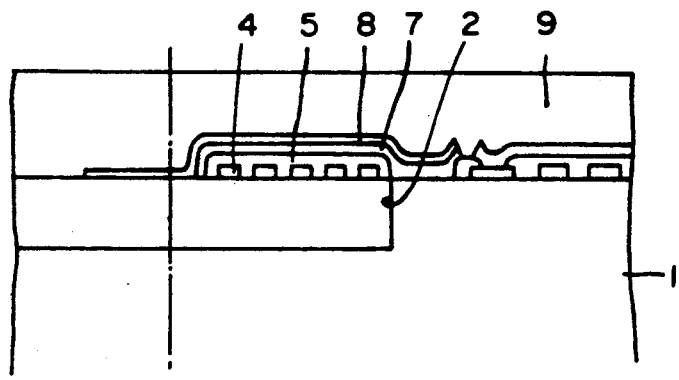
Figure 5A:
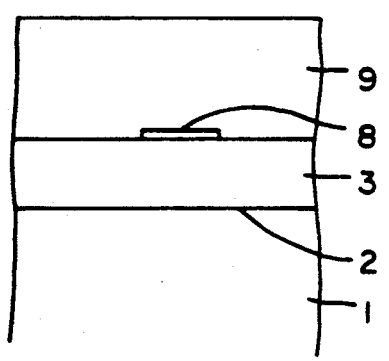
FIG. 5a is a front elevational view of a conventional thin-film magnetic head.
Figure 5B:
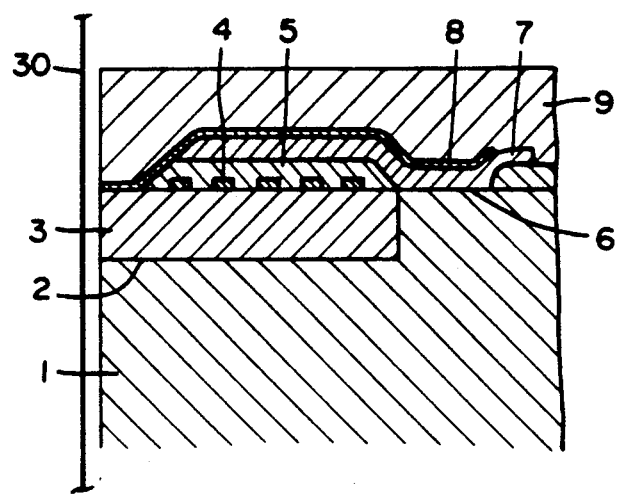

(8) A head protective film 9 is formed on the films 7 and 8 (FIG. 4f).

(9) The substrate 1 is cut in an appropriate positional relation to each groove 2, and is appropriately sized and shaped to make a thin-film magnetic head 40 in the form of a chip as shown in FIGS. 1 and 2.

(10) After terminal areas 42 have been molded from, e.g., a resin on the head, the head is placed in a sputtering apparatus and a thin magnetic film 41 for defining a magnetic shield is formed on the surface of the head (FIG. 1).

The invention will now be described more specifically by way of example.

EXAMPLE

A plurality of grooves each having a width of 0.3 mm, a depth of 0.015 mm and a length of 50 mm were formed by machining in the precisely finished surface of a substrate of Ni-Zn ferrite. Each groove was filled with glass so that the glass might not form more than one bubble having a diameter of five microns or above per cubic millimeter. The same surface of the substrate was mechanochemically polished, and a thin-film conductor coil was formed from copper by sputtering in a specific pattern on the polished surface of the substrate.

An interlayer insulating film was formed from a photosensitive polyimide resin over the coil, and a via hole portion was formed through the insulating film by photolithography. The surface of the insulating film was smoothed by etchback to a roughness not exceeding 500 Å.

A thick main pole film was formed from an amorphous cobalt alloy by sputtering in a specific pattern on the surface of the insulating film and the exposed surface of the substrate. A main pole film was formed from an amorphous cobalt alloy by sputtering in a specific pattern on the main pole film. A head protective film was, then, formed thereon from $Al_2O_3$.

The substrate was appropriately cut, sized and shaped to give a thin-film magnetic head in the form of a chip. The terminal connection areas on the head were masked by a resin, and a magnetic film having a thickness of three microns was formed from a Co-Zr-Nb-Mo alloy by sputtering on the chip, whereby a thin-film magnetic head embodying this invention was obtained.

Figure 6:
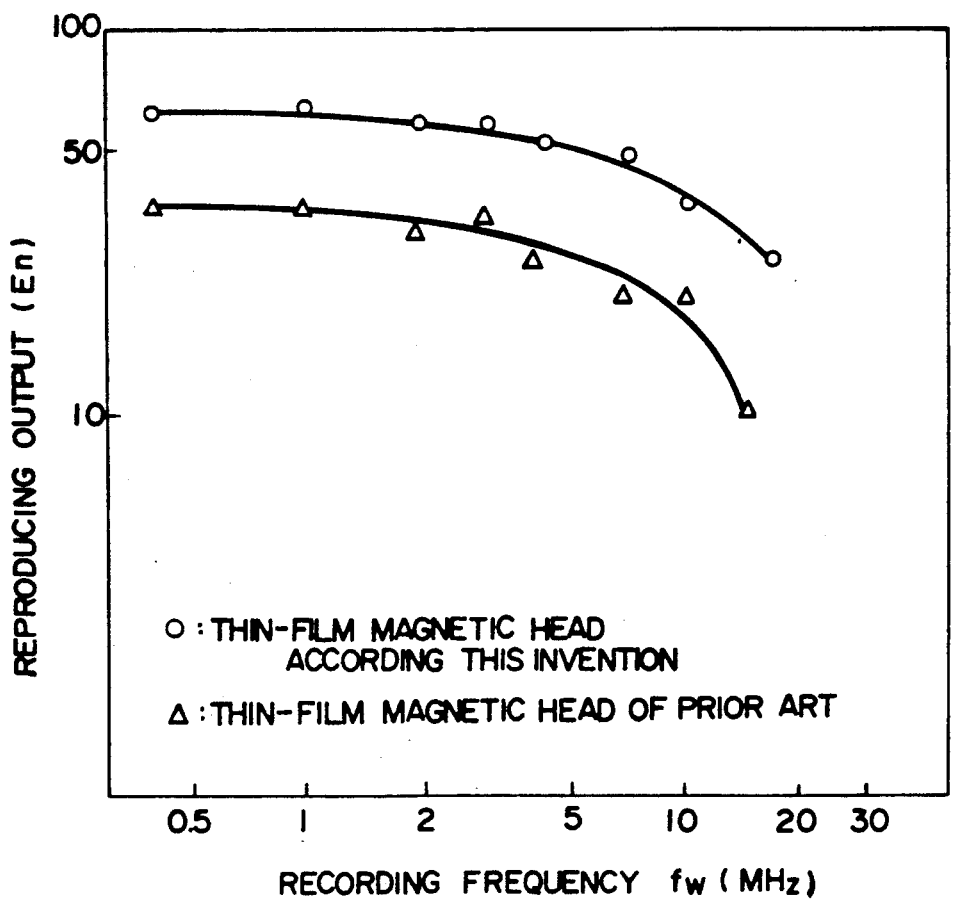
FIG. 6 is a graph comparing the head of this invention and a conventional head with respect to the output for reproduction.

A conventional type of thin-film head not having any film defining a magnetic shield was prepared for comparison with the head of this invention. Both of the heads were tested for output characteristics for reproduction on a self-recording and reproducing basis. The results are shown in FIG. 6. As is obvious from it, the head of this invention exhibited very good output characteristics apparently due to the presence of the thin film defining a magnetic shield, as compared with the conventional head.

The following is a summary of data concerning the heads, the conditions for the preparation thereof, and the tests which have not hereinabove been set forth:

Recording Medium

A medium having a two-layer film composed of CoCr and NiFe, a perpendicular coercive force, $H_c$, of 500 Oe, and a protective film of carbon was used for testing each head.

Head

Both of the head according to this invention and the conventional head had a main pole film composed of a Co-Zr-Nb-Mo alloy and having a thickness of 0.3 micron, and a track width of 50 microns.

Conditions for Mechanochemical Polishing

Machine: A 15-inch mechanochemical polishing machine;
Polisher: A non-woven fabric;
Powder: A powder of MgO having a particle diameter not exceeding 0.02 micron;
Rotating speed: 20 rpm;
Pressure: 0.5 kg/mm$^2$.

Conditions for Diamond Polishing

Machine: A 15-inch single-surface lapping machine;
Polisher: A disk of tin;
Diamond: Particles having a diameter of 0.5 to 1.0 micron;
Rotating speed: 30 rpm;
Pressure: 0.5 kg/mm$^2$.

Conditions for Sputtering

Target: Co-Zr-Nb-Mo alloy;
Power: 500 W;
Gas pressure: 0.4 Pa;
Power source: RF.

Conditions for Recording and Reproducing Output Tests

Disk rotating speed: 3600 rpm;
Medium: CoCr/NiFe;
Recording frequency: 0.5 to 20 MHz;
Recording current: 20 mAp-p;
Relative velocity: $v = 10$ m/sec.

We claim:

1. In a thin-film perpendicular magnetic recording and reproducing head which includes a magnetic member that defines a return path and defines a principal surface having a groove therein and sidewall surfaces, a nonmagnetic material in said groove, and a multilayer film assembly formed above said non-magnetic material when said principal surface is vertically oriented, said multilayer film assembly comprising in sequence a thin-film conductor coil, an interlayer insulating film, a main pole film, and a protective film, said magnetic member being in contact with said main pole film by a via hole, said main pole film extending to said principal surface of said magnetic member, which defines a sliding surface of said head intended to face a magnetic recording medium, the improvement wherein a thin magnetic shield film is connected to said sidewall surfaces of said magnetic member and to said protective film near said principal surface yet spaced from said principal surface by terminal areas.

2. A head as set forth in claim 1, wherein said film serving as a magnetic shield is a film of a soft magnetic material selected from the group consisting of cobalt alloys, Permalloys, Sendusts and ferrites.

3. A head as set forth in claim 1, wherein said film serving as a magnetic shield has a thickness of 200 Å to 100 microns.

4. A head as set forth in claim 3, wherein said thickness is from 1000 Å to 30 microns.

5. A head as set forth in claim 1, wherein said film serving as a magnetic shield is a product of a method selected from the group consisting of sputtering, vacuum deposition, chemical vapor deposition, and plating.

6. A head as set forth in claim 1, wherein said protective film is composed of an inorganic material selected from the group consisting of $Al_2O_3$ and $ZrO_2$.

7. A head as set forth in claim 1, wherein said film serving as a magnetic shield comprises at least one laminate composed of a layer of a soft magnetic material and a non-magnetic layer formed from an inorganic material selected from the group consisting of $Al_2O_3$ and $SiO_2$.

8. A head as set forth in claim 1, further including an intermediate layer formed between said protective film and said film serving as a magnetic shield to ensure an improved adhesion therebetween.

9. A head as set forth in claim 1, further including a protective film formed from a material selected from the group consisting of $Al_2O_3$ and $ZrO_2$, and covering said film serving as a magnetic shield.

10. A head as set forth in claim 1, wherein said magnetic member is composed of a material selected from the group consisting of Ni-Zn ferrite, and Mn-Zn ferrite.

11. A head as set forth in claim 1, wherein said nonmagnetic material is one selected from the group consisting of glass, $SiO_2$, $Al_2O_3$ and barium titanate.

12. A head as set forth in claim 11, wherein said non-magnetic material fills said groove by a method selected from the group consisting of melting, sputtering and vacuum deposition.

13. A head as set forth in claim 10, wherein said magnetic member is composed of a material selected from the group consisting of Mn-Zn ferrite, and an insulating film layer is present between said magnetic member and said coil.

14. A head as set forth in claim 1, wherein said coil is composed of a material selected from the group consisting of gold, copper, chromium and aluminum.

15. A head as set forth in claim 1, wherein said coil is a product of a method selected from the group consisting of sputtering and vacuum deposition.

16. A head as set forth in claim 1, wherein said interlayer insulating film is composed of a material selected from $SiO_2$, $Al_2O_3$ and polyimides.

17. A head as set forth in claim 1, wherein said via hole portion is a product of a method selected from the group consisting of ionic etching and chemical etching.

18. A head as set forth in claim 1, wherein said thick main pole film and said main pole film are each composed of a material selected from the group consisting of iron alloys known as Permalloys and Sendusts, and amorphous cobalt alloys.

19. A head as set forth in claim 1, wherein said thick main pole film and said main pole film are each a product of a method selected from the group consisting of sputtering, vacuum deposition and plating.

* * * * *